April 30, 1957 — A. W. LANE — 2,790,893
PORTABLE ELECTRIC LIGHT
Filed Sept. 12, 1955
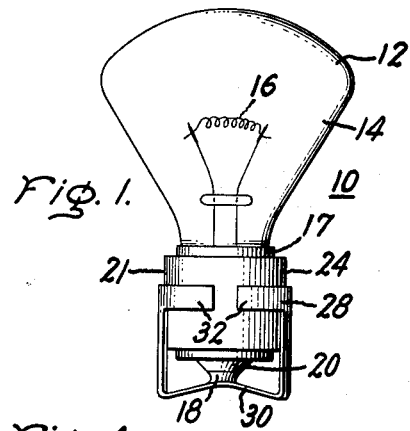
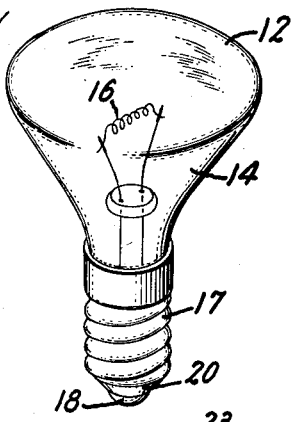
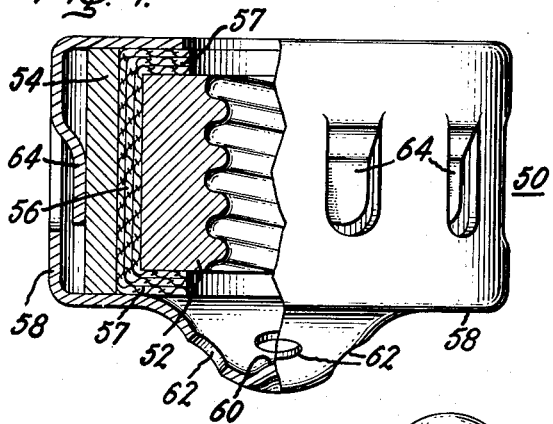
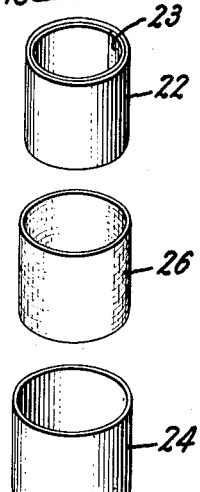
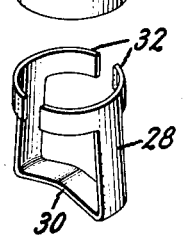
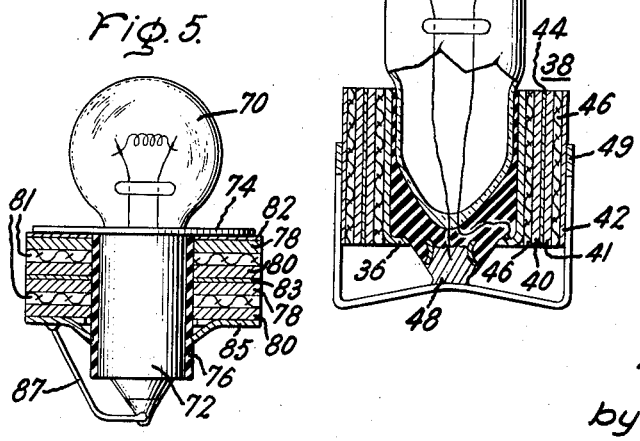
Inventor:
Arnold W. Lane,
by *Claude A. Mott*
His Attorney.

United States Patent Office 2,790,893
Patented Apr. 30, 1957

2,790,893

PORTABLE ELECTRIC LIGHT

Arnold W. Lane, Pittsfield, Mass., assignor to General Electric Company, a corporation of New York Application September 12, 1955, Serial No. 533,803

9 Claims. (Cl. 240—10.61)

This invention relates to portable battery powered electric lights, more particularly to portable electric lights powered by batteries of deferred action type adapted to be stored dry and to be activated at times of use by immersion in water.

Deferred action batteries of this general type are well known and as usually constructed comprise positive and negative electrodes spaced apart by a separator member of water pervious material, the two electrodes being of silver chloride and magnesium, respectively, or of other suitable materials which when immersed together in an electrolyte provide adequate electrical power output for the particular application. If the battery is to be used in salt water the water will itself serve as an electrolyte, for fresh water use it normally is necessary to impregnate the electrode separator member during its manufacture with a salt capable of dissolving in fresh water to form a suitable electrolyte.

The present invention has as its object the provision of a portable electric light wherein a deferred action battery and an electric light bulb are structurally integrated to form a self-contained light source particularly adapted to marine uses such, for example, as distress signals, life raft markers, exercise torpedo position indicators and other such uses in which it is desirable that the light source provide maximum light output and reliability of operation with minimum size and weight.

It is also an object of the invention to provide a deferred action battery including means permitting it to be readily connected to and disconnected from the base of an electric light bulb, so that when thus connected the battery and bulb together form a unitary and self-contained light source capable of energization by immersion of the battery in water.

A further object of the invention is the provision of a portable electric light source structurally combining an electric light bulb and a deferred action battery capable of activation by immersion in water and characterized by small size, light weight, reliability of operation, and ease and economy of manufacture.

In carrying out the invention in one form, there is directly mounted to the base of an electric light bulb which may itself be of conventional type, a deferred action type battery including suitable mounting means providing electrical connection between the battery electrodes and the bulb filament. The positive and negative electrodes of the battery preferably are of silver-chloride and magnesium, respectively, and if desired one of the electrodes may be provided with threads or other integral locking means for readily attaching the battery unit to the bulb base and detaching it therefrom. The battery electrodes, which are in disc or tube form, are maintained in mutually spaced relation by interposed separators of porous nylon or like water pervious material, and for fresh water use these separators may be impregnated with a salt which is soluble in fresh water to form a suitable electrolyte. The battery and bulb form a unitary assembly in use, but if desired they may be made separable so as to permit sale of the battery units separately for subsequent attachment by the user to a suitable bulb.

Further objects, features and advantages of the invention will become more fully apparent and a better understanding of the invention obtained by reference to the following detailed description and the accompanying drawings, wherein:

Figure 1 is an elevation of a combined battery and bulb assembly embodying the invention;

Figure 2 is an exploded view of the battery and bulb assembly of Figure 1 showing its various components;

Figure 3 is a partially sectional view through a modified form of battery and bulb assembly embodying the invention;

Figure 4 is a part sectional view through an alternative form of battery and bulb assembly in accordance with the invention; and Figure 5 is a part sectional view through another form of the invention.

With continued reference to the drawings, wherein like reference numerals have been used throughout to designate like elements, a combined battery and bulb assembly capable of activation merely by dunking or continued immersion in water is illustrated in Figures 1 and 2 and designated generally by reference numeral 10 in Figure 1.

The bulb 12 may as shown be of conventional structure and includes a hollow glass envelope 14 enclosing a filament 16. Bulb 12 is provided with the usual generally tubular metallic base 17 which serves as one electrical connection to filament 16, the other such connection being provided by a metallic button 18 insulated from base 17 as by a hardened body 20 of Bakelite or other insulating material, which commonly also serves to cement together the glass envelope 14 of the bulb and its metallic base 17.

The battery electrode unit 21 is mounted directly to the base 17 of bulb 12, and as best illustrated in Figure 2, the electrode unit comprises generally tubular negative and positive electrodes 22 and 24, respectively, having outside and central aperture diameters such that the electrodes may be telescoped one within the other in concentrically nested relation and separated by a continuous radial gap from end to end thereof. This radial spacing between electrodes is maintained by a separator 26 which will be more fully described hereinafter.

The positive and negative electrodes 24 and 22 preferably are of silver chloride and magnesium, respectively, as this combination of electrode materials has been found to yield high wattage output when used with salt water as electrolyte. Also, both these materials may readily be shaped into tubular form and when so shaped provide adequate structural strength without backing or other support structures. It is to be understood, however, that other electrode combinations such, for example, as magnesium and copper chloride, may successfully be utilized in the battery and bulb assemblies of my invention, the only essential requirement being that the materials provide a satisfactory electrical power output when immersed together in a suitable electrolyte.

The inner electrode 22 may be mounted to the bulb base 17 in any of several ways depending on the particular type of bulb used. For example, electrode 22 may be interiorly threaded so that it may be screwed onto bulbs of screw base type; it may be provided with suitably shaped slots for interengagement with the locking pins of bayonet base type bulbs; or if desired it may be soldered or brazed onto either screw or bayonet base bulbs or merely interference fitted thereon.

To minimize any reaction between the magnesium electrode 22 and bulb base 17 with consequent increase in contact resistance between these elements, electrode 22 preferably is provided with an interior lining 23 of silver either in the form of a sprayed or vaporized coating or in the form of a thin foil rolled into bond with the magnesium. This silver lining 23, the thickness of which is shown greatly exaggerated in Figure 2, also is of advantage in facilitating solder connection of the electrode to the bulb base where such connection is desired.

After assembly of the inner electrode 22 onto the bulb base 17, the separator 26, which may be of nylon, fiber glass or threads of other non-conductive material woven to form a porous cylindrical tube as shown, is assembled over the inner electrode 22. Other separators such as glass beads partially embedded in the surface of one or both of the electrodes, or plain nylon, glass, cotton or other threads arranged generally parallel to the longitudinal axis of the bulb, may instead be used if desired. Regardless of the particular separator construction employed, the separator acts as a spacer and insulator between the inner and outer batter electrodes, and because of its porous construction is permits free passage of ions through the electrolyte and allows the escape of any hydrogen gas generated by the battery reaction.

The outer electrode 24, which is of silver chloride in the specific embodiment being described, is assembled over separator 26 and is then electrically connected to the terminal button 18 of bulb 12 by a generally U-shaped spring clip 28, the base of which may be upwardly bent as at 30 so as to provide positive electrical connection to terminal button 18. The upwardly extending legs of the U-shaped clip 28 may, as shown, together define a split ring 32 which tightly embraces the outer electrode 24 for large area electrical connection therewith and also to provide a degree of protection for the electrode.

Preferably, spring clip 28 is silver plated to minimize reaction between it and the silver chloride electrode which it embraces. If desired, positive electrical connection between the clip and bulb terminal button 20 may be assured by touching the base of the clip with a hot soldering iron, thus causing the solder of which the terminal button is formed to melt and firmly bond to the clip as shown.

As noted above, for salt water applications the water itself serves as a satisfactory electrolyte for the magnesium and silver chloride electrodes described. For fresh water use, the separator 26 may be impregnated during fabrication with a salt capable of dissolving in water to form a suitable electrolyte. Sodium chloride and potassium chloride are exemplary of the many salts which may be used for this purpose, the separator being impregnated with one or more of these salts as by immersion in a concentrated solution of the salt. The separator should be of a material capable of retaining a quantity of the salt sufficient to provide adequate electrolyte for the expected service life of the battery unit when immersed in water.

The rated voltage, amperage and service life of bulb 12 should be properly matched to the battery electrode unit 21 to be mounted to it. Battery voltage is determined by the electrode materials used and by the number of cells incorporated in the battery. As will be more fully explained with particular reference to Figures 3 and 5, it is readily possible to include a plurality of battery cells series connected to provide any desired output voltage. Battery amperage rating is dependent primarily on the area of the electrodes used, and battery service life will vary with the quantity of active material in the electrodes. These variables all should be correlated to the characteristics of the light bulb used, in order to obtain maximum efficiency from the battery-bulb assembly.

The weight of the bulb-battery assembly may be correlated to its volume in a manner to obtain either floating or sinking action as may be desired for the particular application for which the unit is intended. This desired correlation between weight and volume may easily be effected by varying the size of the bulb envelope or by use of auxiliary weights, floats or the like.

The bulb-battery assembly described in the foregoing may be stored dry and when so stored it provides almost indefinite shelf life. However, if the battery separator material is salt-impregnated and the salt used is hygroscopic, as are sodium and potassium chlorides, for example, shelf life of the battery may be at least slightly shortened if the salt is exposed to atmospheric moisture, with consequent moisture absorption and battery reaction. This may easily be prevented merely by sealing the finished units in cellophane, polyethylene or other moisture resistant packaging capable of excluding atmospheric moisture.

In use, to activate the battery and energize the bulb it is merely necessary to moisten the electrode separator 26 and, with the electrolyte thus provided, the battery will generate sufficient wattage to maintain the bulb fully lighted for approximately one-half hour or more depending on the current drawn by the bulb, the size of the battery and other factors. If the separator material used is capable of absorbing and retaining a sufficient quantity of water, the assembly need be dipped only momentarily into the water to provide sufficient electrolyte to last throughout its service life; otherwise it is desirable to maintain the electrode unit immersed in water so long as light is needed.

Turning now to Figure 3, the bulb-battery assembly illustrated in this figure differs from that of Figures 1 and 2 in having the base 36 of its bulb 34 serve as one electrode of the associated battery unit and also in having a multi-cell battery 38 for higher voltage output. Bulb base 36 may be structurally similar to that of the conventional small light bulb and is fabricated of a metal capable of serving as the negative plate of the battery electrode unit. This metal preferably is magnesium, though other metals may successfully be used. For example, the bases of some commercial light bulbs are of aluminum, and aluminum is capable of serving as the negative electrode of a primary battery having a silver chloride or equivalent positive electrode and salt water as the electrolyte. The power output of such a battery does not match that of one having a magnesium electrode, however, and it therefore is preferred to fabricate the bulbs with bases of this more suitable material.

As shown, the battery unit 38 is of multi-cell design with the magnesium bulb base 36 and a surrounding silver chloride electrode 40 constituting one cell, and with a magnesium electrode 41 and a second silver chloride electrode 42 constituting the second cell. The silver chloride electrode 40 of the first cell is electrically connected to the magnesium electrode 41 of the second cell, preferably by an interposed barrier sheet 44 of silver foil or like material capable of minimizing chemical reaction between the magnesium and silver chloride while providing electrical connection therebetween. It will be understood that any desired number of series-connected cells may thus be incorporated in the battery, and where the electrode materials are magnesium and silver chloride the battery voltage output will be approximately 1.2 volts per cell.

The tubular separators 46 and electrodes 40—42 may be assembled over the bulb base 36 in the same manner as described in reference to Figures 1 and 2, and electrical connection is provided between the outermost electrode 42 and the bulb terminal button 48 by a spring clip 49, preferably silver plated, as also described in reference to those figures.

Figure 4 illustrates a form of the invention in which the electrode unit of the battery-bulb assembly is readily attached to and removed from any suitable bulb having a conventional threaded base, thus permitting the ultimate user to quickly mount the battery unit to threaded base bulbs of different types or colors. This arrangement also facilitates re-use of a bulb in event the bulb is of a type having a life expectancy greater than that of the battery.

As shown in Figure 4, the battery 50 comprises inner and outer electrodes 52 and 54, respectively, the inner or negative electrode 52 preferably being fabricated of magnesium and the outer or positive electrode 54 of silver or copper chloride. The two electrodes are maintained in spaced relation by interposed separator means 56 which may be of nylon or like material as described hereinbefore. Separator 56 preferably has its opposite end portions folded inwardly over the inner electrode 52 as at 57 to electrically insulate it from the surrounding metallic casing 58 now to be described.

Casing 58 is fabricated of any suitable electrically conductive material such as copper or aluminum metal and preferably is silver-plated to minimize reaction with electrode 54. As shown, it may be provided at its lower end with an inwardly projecting dimple 60 adapted to firmly contact the terminal button of a light bulb (not shown) when the bulb is screwed into inner electrode 52. One or more holes 62 may be provided in casing 58 for permitting free access of water into the same, and spring contact tongues 64 may, as illustrated, be integrally formed in the side wall of casing 58 in order to assure a positive and low resistance electrical connection between the casing and the outer electrode 54 throughout the service life of the battery.

The battery unit 50 thus assembled may be readily screwed onto and removed from any selected threaded base bulb of suitable voltage and amperage ratings, the resultant assembly then being activated at time of use by dunking or immersing in fresh or salt water. After exhaustion of the battery it may be removed and another substituted, thus enabling re-use of the bulb.

With reference now to Figure 5, the bulb-battery assembly illustrated in this figure has electrodes of disc form rather than tubular electrodes as in the embodiments previously described. As shown, the bulb 70 is of conventional type and includes a metallic base 72 having a radially extending flange 74 which normally is provided with keyhole slots (not shown) for reception of locking pins provided in the bulb socket. Received over bulb base 72 is an insulating sleeve 76 which may be of rubber, ceramic or other electrically non-conductive material, and mounted to this sleeve is a battery unit.

The battery may comprise a selected number of cells each including a magnesium electrode 78 and a silver chloride electrode 80 maintained in mutually spaced relation by an interposed separator disc 81, the electrodes being in the form of discs centrally apertured to snugly fit over insulating sleeve 76. For the reasons explained hereinbefore, barrier sheets 82 and 83 of silver foil preferably are interposed between the uppermost magnesium electrode 78 and bulb flange 74, and between the silver chloride electrode of the upper battery cell and the magnesium electrode of the lower cell. It will be understood that the number of cells included in the battery may be adjusted to match the battery output voltage to the bulb on which it is used, and that if desired, the arrangement of the electrode discs on the bulb base may be reversed so as to place one of the silver chloride electrodes uppermost in the stack.

The electrodes 78 and 80 may be held in assembled relation on the bulb base by any suitable means such as the "star" washer 85 illustrated, and electrical connection to the bulb terminal button may be provided as by a conductor 87 soldered to washer 85 and to the terminal button.

As will be apparent from the foregoing, the integrated battery and bulb assemblies of my invention offer the important advantages of light weight, reliability, and simplicity and economy of manufacture. Positively or negatively buoyant versions of this light source may advantageously be employed in many applications such as those specifically enumerated above, and offer advantages for use in these and other such applications not obtainable with any other light source of my knowledge.

While a number of specific embodiments of the invention have been shown and described, it will be understood that various other modifications may be made without departing from the invention. The appended claims are therefore intended to cover all such modifications as fall within the true spirit and scope of the invention.

What I claim as new and desire to secure by Letters Patent of the United States is:

1. A portable electric light assembly comprising a hollow glass bulb enclosing a filament and having a generally tubular base portion through a wall of which extend lead wires from said filament, a deferred action battery unit comprising concentrically nested tubular positive and negative electrode members separated by an interposed tubular separator member, the inner of said tubular electrode members being at least partially received on the tubular base portion of said bulb substantially coaxially therewith and directly mechanically connected thereto, and means providing permanent electrical connections between said positive and negative electrodes and said filament lead wires on assembly of the bulb and battery unit.

2. A light source as defined in claim 1, wherein said separator member is of porous material impregnated with a salt soluble in water to form an electrolyte.

3. A light source as defined in claim 1, wherein said positive electrode is of silver-chloride and said negative electrode is of magnesium.

4. A battery powered electric light source capable of activation by immersion in water comprising a hollow glass bulb enclosing a filament and having a generally tubular base portion through a wall of which extend lead wires from said filament with one of said lead wires electrically connected to terminal button means disposed adjacent an end of said bulb tubular base portion, a deferred action battery unit comprising generally tubular positive and negative electrode members disposed in telescope relation with respect to each other and to the tubular base portion of said bulb with said electrode members being maintained in radially spaced relation by interposed separator means and said inner electrode being received over and directly mechanically connected to said bulb, the outer of said electrode members being electrically connected to said bulb terminal button means and its connected lead wire and the inner of said electrodes being electrically connected to the other of said lead wires.

5. A light source as defined in claim 4, wherein said inner electrode constitutes a metallic base for said bulb and is fixedly mounted to the tubular base portion of said bulb in electrically non-conductive relation to said bulb terminal button and permanently electrically connected to said other lead wire.

6. A light source as defined in claim 4, wherein said light bulb includes a generally tubular metallic base member received over the tubular base portion of said bulb and fixed thereto and to said bulb terminal button, said inner electrode being mounted to said metallic base member in telescoped relation therewith and electrically connected thereto.

7. A light source as defined in claim 4, wherein electrical connection between said outer electrode and said bulb terminal button is provided by generally U-shaped spring clamp means with the base of the U being upwardly deflected adjacent the center thereof to engage said terminal button and the legs of the U shaped to resiliently engage oppositely disposed surfaces of said outer electrode.

8. A light source as defined in claim 4, wherein electrical connection is provided between said outer electrode and said bulb terminal button by a metallic casing at least partially enclosing said outer electrode and having an end wall adapted to engage the bulb terminal button when said electrode unit and casing are mounted onto said bulb.

9. A battery powered electric light source adapted to be activated by water immersion comprising a hollow glass bulb enclosing a filament and having a generally tubular metallic base member threaded along the length thereof and electrically connected to one of the electrical lead wires to said filament with the other electrical lead wire therefrom connected to bulb terminal button means mounted to said metallic base and electrically insulated therefrom, a deferred action battery unit including concentrically nested generally tubular positive and negative electrode members with the inner of said electrode members being interiorly threaded correspondingly to said bulb base for threaded engagement therewith, separator means for maintaining said electrode members in radially spaced relation with respect to each other throughout the length thereof, and means providing electrical connection between the outer of said electrodes and said bulb terminal button when said electrode unit is screwed onto the bulb base by the threaded interengagement between said bulb base and said inner electrode.

References Cited in the file of this patent

UNITED STATES PATENTS

| | | |
|---|---|---|
| 1,074,376 | Neudorffer | Sept. 30, 1913 |
| 1,327,017 | Boltshauser | Jan. 6, 1920 |
| 2,070,818 | Winckler | Feb. 16, 1937 |
| 2,118,996 | Winckler | May 31, 1938 |

FOREIGN PATENTS

| | | |
|---|---|---|
| 1,084,735 | France | Jan. 24, 1955 |